UNITED STATES PATENT OFFICE.

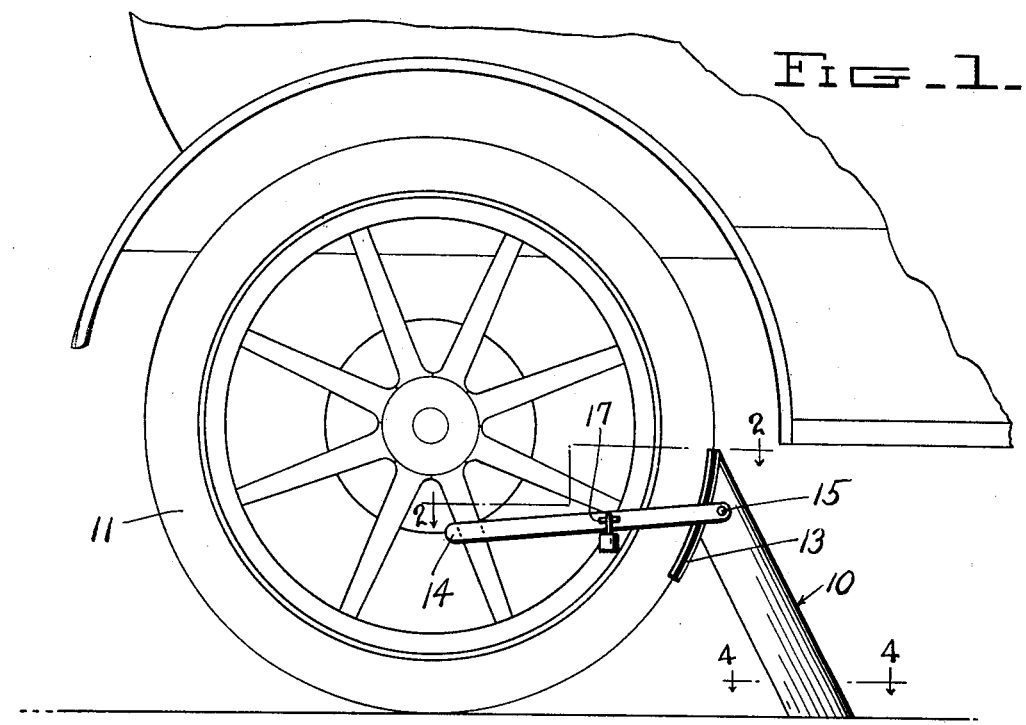
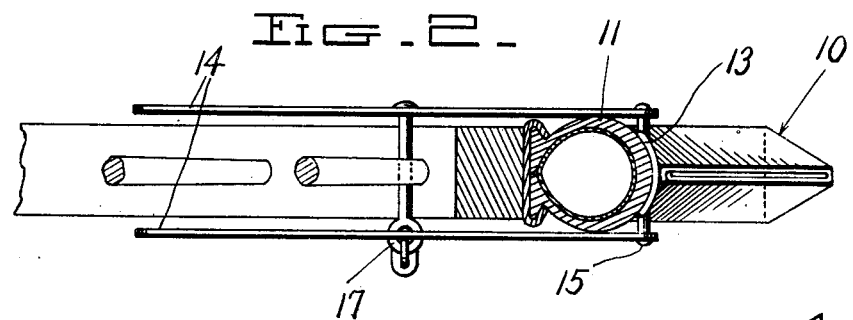
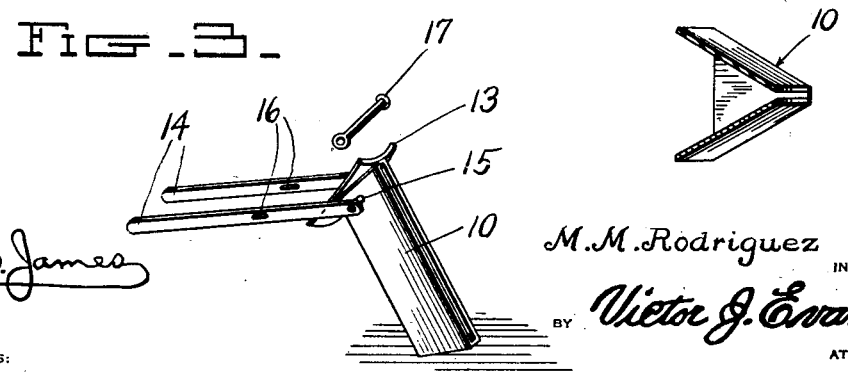

MARIANO MAGDALENO RODRIGUEZ, OF EL PASO, TEXAS.

VEHICLE-WHEEL ATTACHMENT.

1,370,364.  Specification of Letters Patent.  Patented Mar. 1, 1921.

Application filed March 16, 1920. Serial No. 366,379.

*To all whom it may concern:*

Be it known that I, MARIANO MAGDALENO RODRIGUEZ, a citizen of Mexico, residing at El Paso, in the county of El Paso and State of Texas, have invented new and useful Improvements in Vehicle-Wheel Attachments, of which the following is a specification.

This invention aims to provide a wheel attachment, which when associated with the wheel prevents rotation thereof, and thereby prevents theft of the vehicle or its use by unauthorized persons.

The invention provides a device for this purpose which can be quickly and easily associated with the wheel of the vehicle, or removed therefrom when the occasion requires, the device being extremely simple in construction so that it can be manufactured and sold at a nominal cost.

More specifically stated, the invention makes use of a block or the like, designed to fit snugly between the ground and the tread of the wheel, with means for holding the block in active position to prevent the turning of the block to either side out of engagement with the tread of the wheel.

The nature and advantages of the invention will be better understood when the following detail description is taken in connection with the accompanying drawings, the invention residing in the construction, combination and arrangement of parts as claimed.

In the drawings forming part of this application like numerals of reference indicate similar parts in the several views and wherein:—

Figure 1 is a view showing the device associated with the wheel of a vehicle.

Fig. 2 is a plan view taken on line 2—2 of Fig. 1 certain parts being shown in section.

Fig. 3 is a perspective view of the attachment.

Fig. 4 is a sectional view taken on line 4—4 of Fig. 1.

Referring to the drawings in detail, 10 indicates a block which may be constructed from any suitable material and of a height to snugly fit between the ground and the tread of the tire 11 in the manner as shown in Fig. 1. The block is preferably formed from metal and of substantially V-shaped formation in section. The block is disposed at an inclination to the wheel as shown, while the upper end of the block is provided with a tire engaging member 13 which is concaved to conform to the shape of the tire which it partially receives. The tire engaging member 13 may form an integral part of the block, or it may be a separate element secured to the block in any suitable manner.

Projecting from the opposite sides of the block 10 at a point adjacent the upper end thereof, are parallel attaching bars 14 which are arranged at opposite sides of the wheel when the device is associated with the latter. The members 14 may be fixed to the block 10 in any suitable manner but are preferably associated with the block by means of a bolt 15 upon which the bars 14 are pivoted. The bars 14 are provided with alined slots 16, through which an eye-bolt 17 is adapted to be passed for holding the attachment associated with the wheel, a pad-lock 18 being connected with the eye-terminal of the bolt for this purpose.

In use, the block is arranged upon the ground in position with respect to the wheel so that the concaved member 13 partly embraces the tread of the tire. The block is also arranged at an inclination to the wheel as shown in Fig. 1. When the block is thus positioned, the attaching bars 14 are arranged horizontally at opposite sides of the wheel and secured thereto by means of the bolt 15. When this bolt is passed through the slot of the bars, the padlock secures the bolt in position, the bolt resting upon the inner periphery of the wheel, thus supporting the arms 14 in a substantially horizontal position. The arms 14 are of sufficient length to project beyond one or more spokes of the wheel so that the block cannot be shifted laterally to either side of the wheel beyond the tread of the tire to an inactive position, by anyone attempting to steal or use the machine with which the attachment is associated. It is manifest, that when the device is associated with the wheel in a manner described, the wheel cannot be rotated, and consequently theft of the car or its use by an unauthorized person is prohibited.

While it is believed that from the foregoing description, the nature and advantages of the invention will be readily apparent, I desire to have it understood that I do not limit myself to the details of construction herein shown, and that such changes may be resorted to when desired as fall within the scope of what is claimed.

What I claim is:—

A vehicle attachment comprising an elongated member adapted to be positioned between the ground and the wheel, and at an inclination to the latter, said member being of substantially V-shaped formation in section and tapered from its upper to its lower end, the tire engaging element carried by the upper small end of the member and shaped to conform to the curvature of the tire, lugs projecting from the opposed sides of said member and extending beyond the opposite sides of the tire engaging member, arms pivoted on said lugs to straddle the wheel and arranged in parallelism with the opposite sides of the wheel, said arms having elongated slots, a pin passed through the slots arranged at one side of the adjacent spoke, a padlock associated with the pin for the purpose specified.

In testimony whereof I affix my signature.

MARIANO MAGDALENO RODRIGUEZ.